(12) United States Patent
Ottesen et al.

(10) Patent No.: US 7,590,293 B2
(45) Date of Patent: *Sep. 15, 2009

(54) NON-ITERATIVE METHOD TO RESTORE IMAGE FROM TRANSFORMED COMPONENT DATA

(75) Inventors: Hal H. Ottesen, Mazeppa, MN (US); James P. Licari, Rochester, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 938 days.

This patent is subject to a terminal disclaimer.

(21) Appl. No.: 10/837,981

(22) Filed: May 3, 2004

(65) Prior Publication Data

US 2004/0223651 A1 Nov. 11, 2004

Related U.S. Application Data

(60) Provisional application No. 60/467,862, filed on May 5, 2003.

(51) Int. Cl.
*G06K 9/36* (2006.01)
(52) U.S. Cl. ................. 382/232; 382/254; 382/280; 708/403
(58) Field of Classification Search ........... 382/232, 382/254, 280; 708/403
See application file for complete search history.

(56) References Cited

U.S. PATENT DOCUMENTS

| | | | |
|---|---|---|---|
| 5,825,892 | A | 10/1998 | Braudaway et al. |
| 6,178,271 | B1 | 1/2001 | Maas, III |
| 6,195,465 | B1 | 2/2001 | Zandi et al. |
| 6,427,028 | B1 | 7/2002 | Donescu et al. |
| 6,535,614 | B1 | 3/2003 | Kimura et al. |
| 6,625,297 | B1 | 9/2003 | Bradley |
| 6,873,744 | B2 * | 3/2005 | Ottesen ............ 382/280 |
| 2003/0053628 | A1 * | 3/2003 | Hirai et al. ......... 380/210 |
| 2003/0095682 | A1 * | 5/2003 | Joo et al. ........... 382/100 |

OTHER PUBLICATIONS

Hayes et al.; "Signal reconstruction from phase or magnitude"; IEEE, vol. ASSP-28, No. 6; Dec. 1980; pp. 672-680.*
"Prosecution File History for U.S. Appl. No. 10/124,547", (issued as US 6,873,744), 121 pgs.
"Section 1.4 Additional Properties of the Fourier Transform", *In: Two-Dimensional Signal and Image Processing*, Lim, J. S., Editor, Prentice Hall, Inc., Englewood Cliffs, NJ, (1990), 31-39.
"Table of Contents and Preface", *In: Image Recovery: Theory and Application*, Stark, H., Editor, Academic Press, Inc., Orlando, FL (1987), 14 pgs.
Hayes, Monson H., "The Reconstruction of a Multidimensional Sequence From the Phase or Magnitude of Its Fourier Transform", *IEEE Transactions on Acoustics, Speech, and Signal Processing*, vol. ASSSP-30, No. 2, (Apr. 1982),140-154.

* cited by examiner

*Primary Examiner*—Vikkram Bali
*Assistant Examiner*—Eueng-Nan Yeh
(74) *Attorney, Agent, or Firm*—Schwegman, Lundberg & Woessner, P.A.

(57) ABSTRACT

An original image or other data sequence is modified with an internal marker value, and is communicated (stored and/or transmitted) as one component of a transform having multiple complementary components. The image is restored in a closed form, without iteration, and in some cases without any loss of precision from the original image. The original image may have complex element values. Multiple original images may be combined, and separated after restoration. Several types of maps may be embedded in or packaged with the communicated component. Communicated component elements may be stored with variable lengths.

27 Claims, 14 Drawing Sheets

```
function       MXC = eureka01(I,a,phi)

%EUREKA01      Derivation of DFT magnitude with an added complex marker
%              MXC using an N-Dimensional approach.
%
%              INPUT
%                   I   =  original N-Dimensional image
%                   a   =  gain value [ 1e4 < a < 1e5 ]
%                   phi =  marker phase [degrees]
%
%              OUTPUT
%                   MXC =  DFT magnitude with embedded complex marker
%
%              SYNTAX
%                   J   =  eureka01(I,a,phi);
%

I = double(I);                    % Convert to double precision
[N1,N2,N3,N4] = size(I);          % Dimensions of I
R = a*N1*N2*N3*N4;                % Marker radius  R
P = phi*pi/180;                   % Convert marker phase to radians
C = R*exp(j*P);                   % Complex marker
XC = fftn(I) + C;                 % N-D DFT of I and complex marker added
MXC = abs(XC);                    % N-D DFT magnitude with complex marker
```

*FIG. 3*

```
function      [J,theta] = eureka02(MXC,a,phi)

%EUREKA02     Image restoration (J) from DFT magnitude with an
%             added complex marker using a N-D approach.
%
%             INPUT
%               MXC   =  N-dimensional DFT magnitude with added
%                        complex marker
%                 a   =  gain value [ 1e4 < a < 1e5 ]
%               phi   =  marker phase [degrees]
%
%             OUTPUT
%                 J   =  restored N-D image
%             theta   =  retrieved phase [radians]
%
%             SYNTAX
%                   [J,theta]   =   eureka02(MXC,a,phi);
%

R = a*prod(size(MXC));            % Compute marker radius
P = phi*pi/180;                   % Convert degrees to radians
Q = ifftn(MXC);                   % Compute the N-D inverse DFT
                                  %    of DFT-magnitude % Even sequence computation
even = real(Q);                               % Approximate even J sequence
even(1,1,1,1) = even(1,1,1,1) - R;            % Subtract marker radius
even = even/cos(P)+eps;                       % Divide by cos(P)
even = round(2*even)/2;                       % Exact even sequence of J % Odd sequence computation
odd = -imag(Q)/sin(P);                        % Approximate odd J sequence
odd = round(2*odd)/2;                         % Exact odd sequence of J % Add even and odd sequence
J = even + odd;                               % Combine for total image % Phase retrieval
theta = angle(fftn(even)+fftn(odd));% Phase retrieval
```

*FIG. 5*

$$(601) \quad \underline{X}(k) = \begin{cases} \sum_{n=0}^{N-1} X(n)\exp(-j2\pi kn/N), & 0 \leq k \leq N-1 \\ 0, & \text{otherwise} \end{cases}$$

$$(602) \quad X(n) = \begin{cases} \sum_{k=0}^{N-1} \underline{X}(k)\exp(j2\pi kn/N), & 0 \leq n \leq N-1 \\ 0, & \text{otherwise} \end{cases}$$

$$(603) \quad \underline{X}(k) = \underline{RX}(k) + j\underline{IX}(k) = \underline{MX}(k)\exp(j\underline{PX}(k))$$

$$(604) \quad aX_1(n) + bX_2(n) \approx a\underline{X}_1(k) + b\underline{X}_2(k)$$

$$(605) \quad EX(n) = \frac{X(n) + X(-n)}{2}$$

$$(606) \quad \underline{EX}(k) = \sum_{n=0}^{N-1} EX(n)\exp(-j2\pi kn/N) = \underline{RX}(k)$$

$$(607) \quad OX(n) = \frac{X(n) - X(-n)}{2}$$

$$(608) \quad \underline{OX}(k) = \sum_{n=0}^{N-1} OX(n)\exp(-j2\pi nk/N) = \underline{IX}(k)$$

*FIG. 6A*

(609) $\underline{C}(k) = \begin{cases} \sum_{n=0}^{N-1} C(n)\exp(-j2\pi kn/N), & 0 \leq k \leq N-1 \\ 0, & \text{otherwise} \end{cases}$ (610) $\underline{C} = \underline{MC}\exp(j\underline{PC}) = \underline{MC}\cos(\underline{PC}) + j\underline{MC}\sin(\underline{PC})$ (611) $XC(n) = \begin{cases} X(0) + C, & n = 0 \\ X(n), & 1 \leq n \leq N-1 \end{cases}$ (612) $\underline{XC}(k) = (\underline{RX}(k) + \underline{MC}\cos(\underline{PC})) + j(\underline{IX}(k) + \underline{MC}\sin(\underline{PC}))$
$= \underline{RXC}(k) + j\underline{IXC}(k)$ (613) $\underline{MXC}(k) = \sqrt{(\underline{RXC}(k))^2 + (\underline{IXC}(k))^2}$ (614) $EQAC(n) = \begin{cases} \text{Real}\left[\dfrac{1}{N}\sum_{k=0}^{K-1}\underline{MXC}(k)\exp(j2\pi kn/N)\right], & 0 \leq n \leq N-1 \\ 0, & \text{otherwise} \end{cases}$ (615) $OQAC(n) = \begin{cases} -j\,\text{Imag}\left[\dfrac{1}{N}\sum_{k=0}^{K-1}\underline{MXC}(k)\exp(j2\pi kn/N)\right], & 0 \leq n \leq N-1 \\ 0, & \text{otherwise} \end{cases}$ (616) $EQA(n) = \begin{cases} (EQAC(0) - \underline{MC})/\cos(\underline{PC}), & n = 0 \\ EQAC(n)/\cos(\underline{PC}), & 1 \leq n \leq N-1 \end{cases}$ (617) $OQA(n) = OQAC(n)/\sin(\underline{PC}),\ 0 \leq n \leq N-1$

*FIG. 6B*

$$(618) \quad EQ(n) = \frac{\text{Integer}[2EQA(n)]}{2}$$

$$(619) \quad OQ(n) = \frac{\text{Integer}[2OQA(n)]}{2}$$

$$(620) \quad Q(n) = EQ(n) + OQ(n)$$

$$(621) \quad \underline{MQ}(k) = \sqrt{\underline{RQ}(k)^2 + \underline{IQ}(k)^2}$$

$$(622) \quad \underline{PQ}(k) = \arctan\left[\frac{\underline{IQ}(k)}{\underline{RQ}(k)}\right]$$

*FIG. 6C*

```
function   J = phase_only(I,a)

% PHASE_ONLY  Exploration of phase-only method on REAL spatial data
%
%               I = image or sequence in base-domain
%               a = constant, a function of the resolution of I
%                  (typical values in the range    1e6 < a < 1e8
%
%            SYNTAX
%               J = phase_only(I,a);
%

% Data handling process
% ====================
I = double(I);
[N1,N2] = size(I);
XI = fft2(I);              % 2-D DFT of image
R = a*N1*N2;               % Compute marker radius
phi = pi/4;                % Set the marker phase to pi/4 or 45 degrees
C = R*exp(j*phi);          % Compute complex marker
% Add complex marker C = R*exp(j*phi) to the DFT, called XI
XIC = XI + C;              % Add complex marker
% Compute phase of XC, i.e., PXC')
PXIC = angle(XIC);
% This value PXIC is stored or transmitted at 50% savings
% +++++++++++++++++++++++++++++++++++++++++++++++++++++++++
```

*FIG. 8*

```
% Retrival process from stored or transmitted PXIC
% =================================================
YIC = exp(j*PXIC);         % Form complex DFT from phase PXIC
% Take inverse DFT2 of YIC, JC
JC = ifft2(YIC);           % Take 2-D inverse DFT
% Subtract exp(j*phi) from the JC(1,1) element
JC(1,1) = JC(1,1)-exp(j*phi);
J = JC;
J = R*J;                   % Multiply J by marker radius R
J = real(J)                % Computing the real part
J = round(2*J);            % Reconstructed image
```

```
function        J = smag2(I,mark)

%SMAG2          Two-dimensional magnitude-only reconstruction
%
%               INPUT
%                   I    =  2D sequence
%                   mark =  marker value (around mark = 5e8)
%
%               OUTPUT
%                   J    =  restored image
%
%               SYNTAX
%                   J = smag2(I,mark);
%

I = double(I);
[N1,N2] = size(I);

% Checking for binary image
if sum(I(:)) < N1*N2
    K = 255;
else
    K = 1;
end
I = K*I;
X2 = fft2(I);                       % DFT2 of I
M2 = abs(X2);

map2 = 1 - 2*(angle(X2) < 0);       % Sign-map for argument (phase) component
J = I;
J(1,1) = J(1,1) + mark;
JX2 = fft2(J);                      % DFT of x1
MJX2 = abs(JX2);                    % DFT magnitude with embedded marker of JX2
%==================================
% MJX2 is stored or transmitted
%==================================
```

*FIG. 12*

```
% ====================================
% Reconstruction of image from MJX2
% ====================================
rjx2 = real(ifft2(MJX2));      % Approximation to real DFT part of X1
rix2 = rjx2;
rix2(1,1) = rix2(1,1) - mark;  % Remove marker
rix2 = round(2*rix2)/2;        % Round value twice and divide by 2

RIX2 = real(fft2(rix2));       % Approximation to real DFT2 part of X2
B = mark*sqrt(1 + 2*RIX2/mark);
MIX2 = sqrt(abs(MJX2 - B)).*sqrt(MJX2 + B);
% The above can be done in several different ways
MIX2 = real(MIX2);
PIX2 = acos(RIX2./MIX2);       % Facts of life
PIX2 = map2.*PIX2;             % Adding sign-map
JX = MIX2.*exp(j*PIX2);        % Composing restored complex DFT
J = real(ifft2(JX));           % Restored image  J
J = round(J);                  % Rounded, restored image
J = J/K;                       % Restored image
```

*FIG. 14*

NON-ITERATIVE METHOD TO RESTORE IMAGE FROM TRANSFORMED COMPONENT DATA

CLAIM OF PRIORITY

This application claims priority under 35 USC 119(e) from U.S. Provisional Application Ser. No. 60/467,862, filed May 5, 2003, which application is incorporated herein by reference.

TECHNICAL FIELD

The present invention relates to image data processing, and more particularly concerns restoring an image from a transformed version that includes less than all components of the transformed data.

BACKGROUND

Digitized images require the storage and communication of large amounts of data. Medical imaging, graphics for games, military reconnaissance, space-based astronomy, and many other applications increasingly strain storage capacity and transmission bandwidth.

Although image compression techniques exist, some images, for example computerized tomography (CT) medical images require high resolution, high accuracy, and low contrast. Retrieval of these types of images must be lossless, or nearly so. Even less demanding applications are always open to further data compression.

A number of sources produce images in a transform domain, such as the frequency domain. For example, magnetic resonance imaging (MRI) scans, ultrasound scans, and computed tomography/microscopy devices output magnitude/phase data rather than spatial pixels to represent an image. Transform-domain images produce large amounts of data. For example, a spatial image 1000 pixels square, with 8-bit grayscale resolution requires one megabyte of data. A typical double-precision Fourier transform of that image produces about 16 MB of data: 8 MB for the magnitude component and 8 MB for the phase component. The frequency or magnitude component carries some of the information corresponding to the underlying spatial-domain image, and the complementary phase component carries the rest of the information. The ability to restore or reconstruct a spatial-domain image from only one of these transform-domain components could halve the bandwidth and/or time required to transmit the full image in either the spatial or transform domain. Storing only one component could reduce by 50% the space requirements on a disk or other medium. The U.S. Food and Drug Agency (FDA) requires that all medical source data has to be stored. Even when an image is generated initially in the spatial domain, it may be desirable to store or transmit the image in a transform-domain form.

Copending commonly assigned U.S. patent application Ser. No. 10/124,547, filed Apr. 17, 2002, demonstrates an iterative technique for restoring a spatial-domain image transmitted or stored as a single component of a transform-domain representation. Unlike previous such techniques, it requires no special conditions in the original image. However, being iterative, it requires processing time and capacity to pursue a number of iterations, making it hundreds or even thousands of times more computation intensive than a non-iterative or closed-form technique. Also, restoration is not lossless; the solution can only approach the pixel values of the original image more or less closely.

SUMMARY

The present invention offers methods for modifying an original image, communicates a single component of the image in a transform domain, and restores the original image in closed-form, non-iterative processes. The invention encompasses methods, systems, and media.

DRAWING

FIG. 3 shows an example computer program for modifying an original image for restoration.

FIG. 5 shows a computer program for restoring a modified image from a single transform-domain component.

FIGS. 6A-6C present a demonstration that image restoration is lossless.

Figure 7:
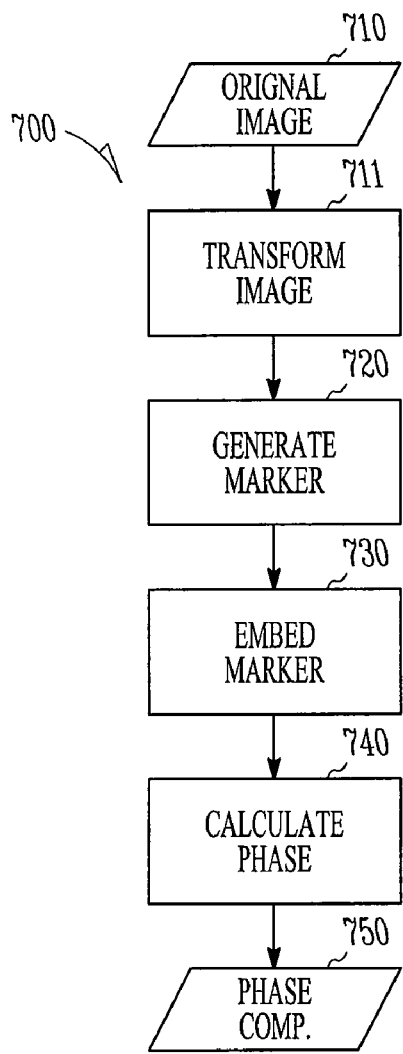

FIG. 7 is a flowchart of another example method for modifying an original image.

FIG. 8 shows another example computer program for modifying an original image.

Figure 9:
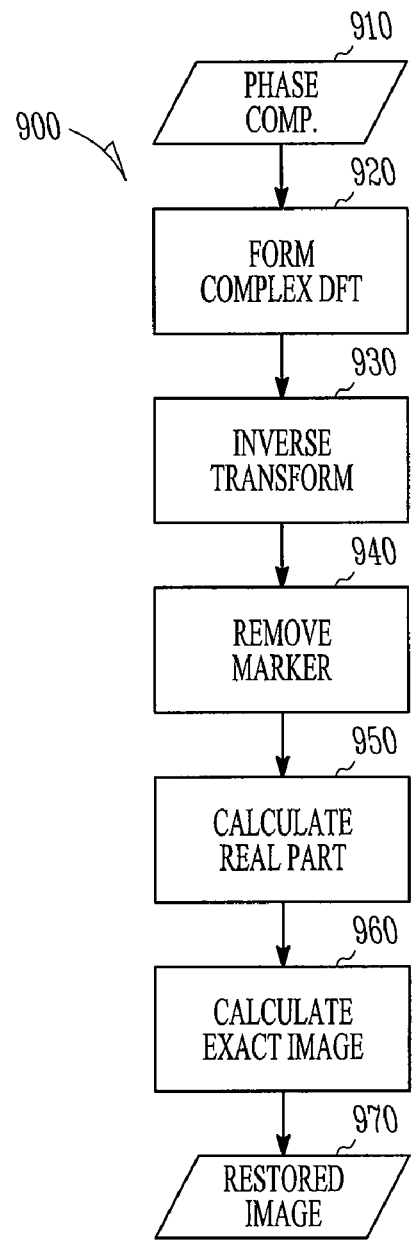

FIG. 9 is a flowchart of another example method for restoring a modified image.

FIG. 10 shows another example program for restoring a modified image from a single transform-domain component.

Figure 11:
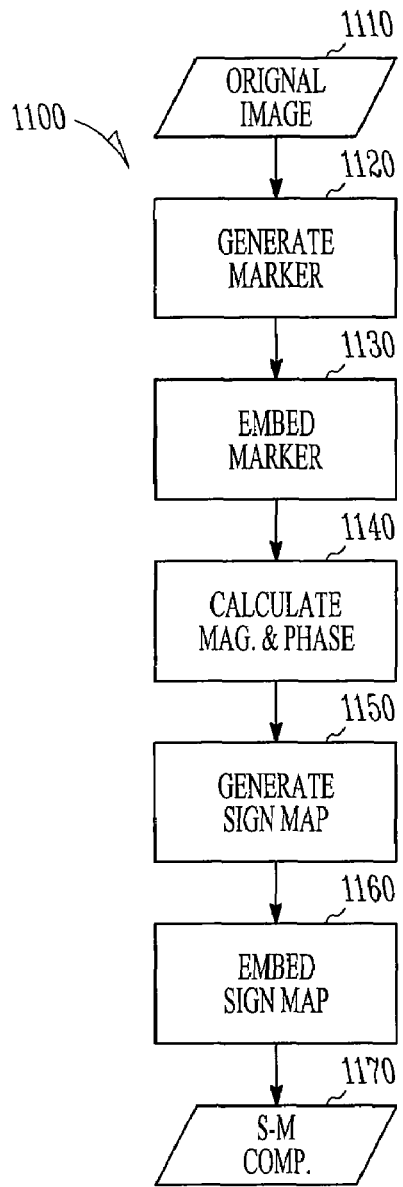

FIG. 11 is a flowchart of a further example method for modifying an original image for restoration.

FIG. 12 shows a further example program for modifying an original image.

Figure 13:
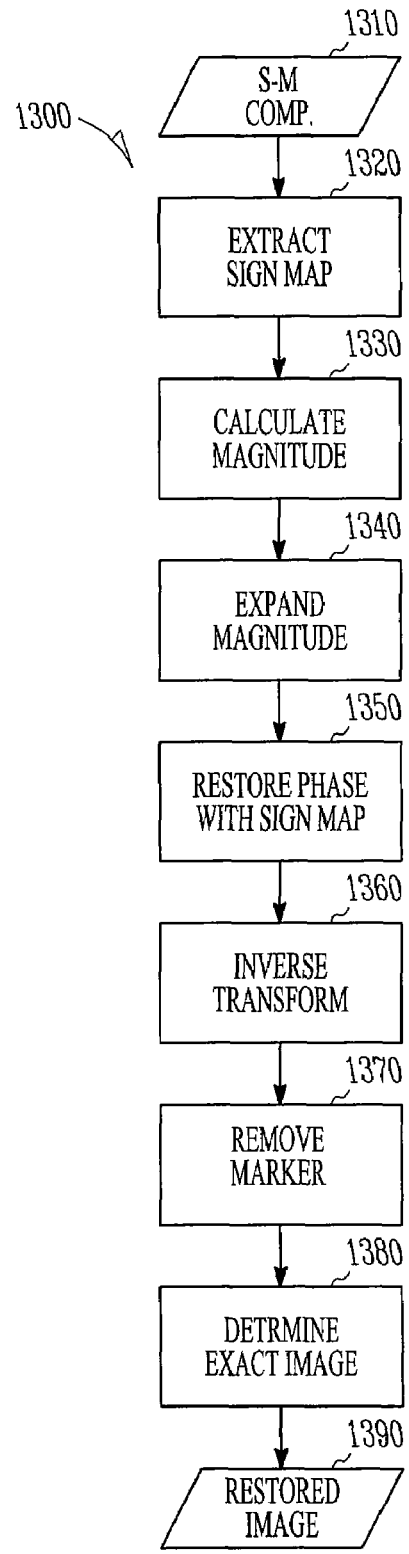

FIG. 13 is a flowchart of a further example method for restoring a modified image.

FIG. 14 shows a further example program for restoring a modified image.

Figures 15, 16:
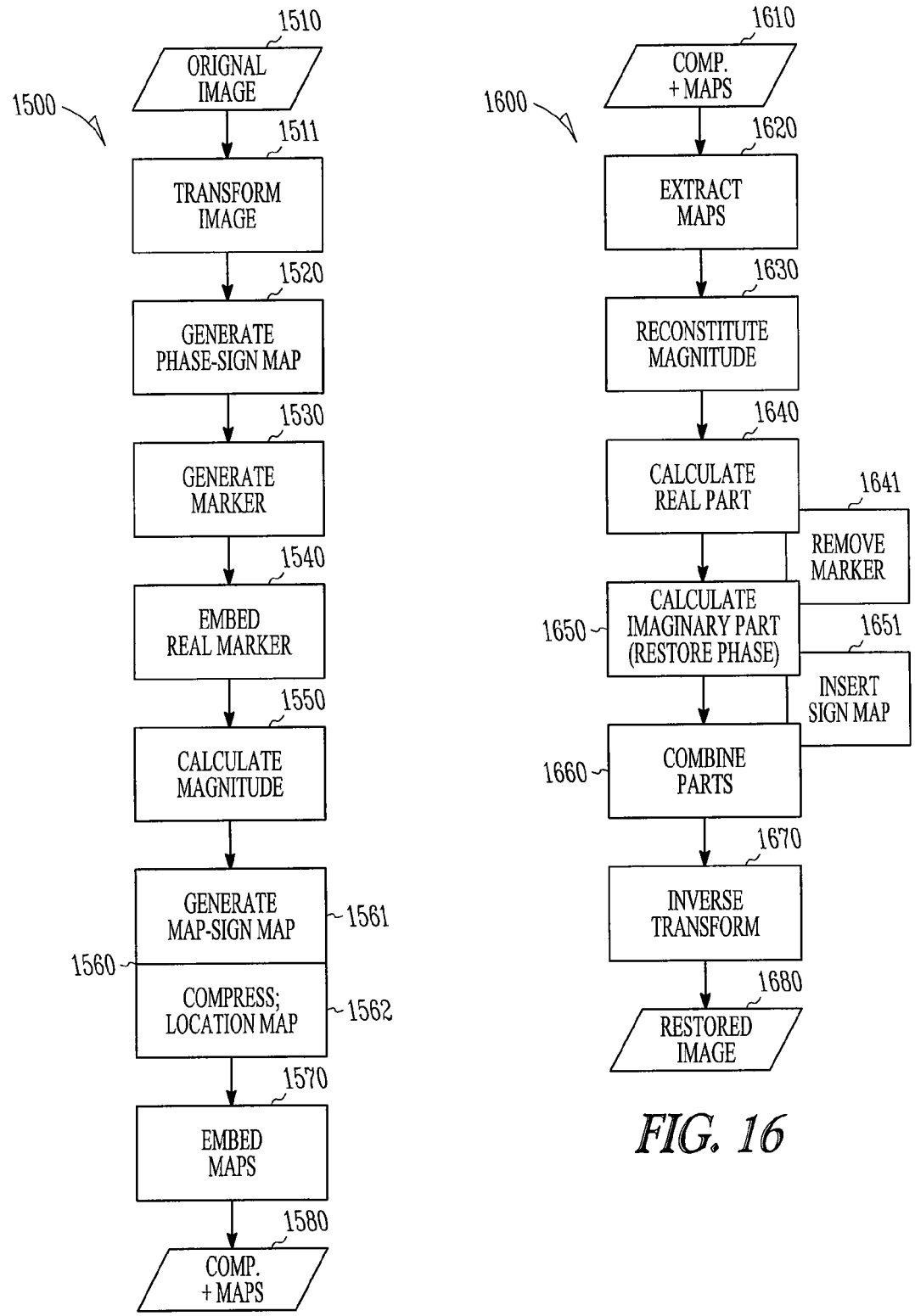

FIG. 15 is a flowchart of an additional example method for modifying one or more original images.

FIG. 16 is a flowchart of an additional example method for restoring one or more modified images.

Figure 17:
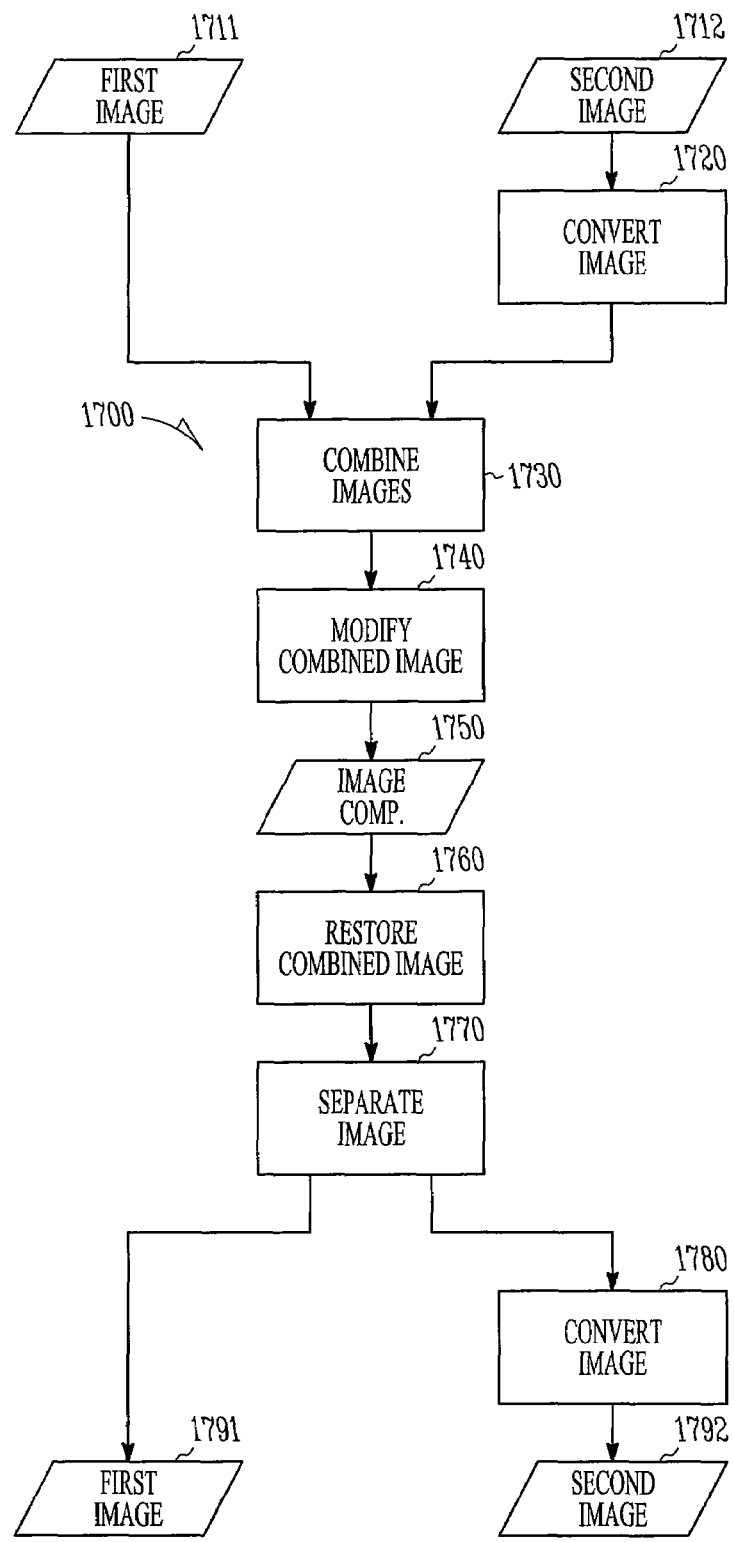

FIG. 17 shows an application of the methods of FIGS. 15 and 16.

DETAILED DESCRIPTION

Figure 1:
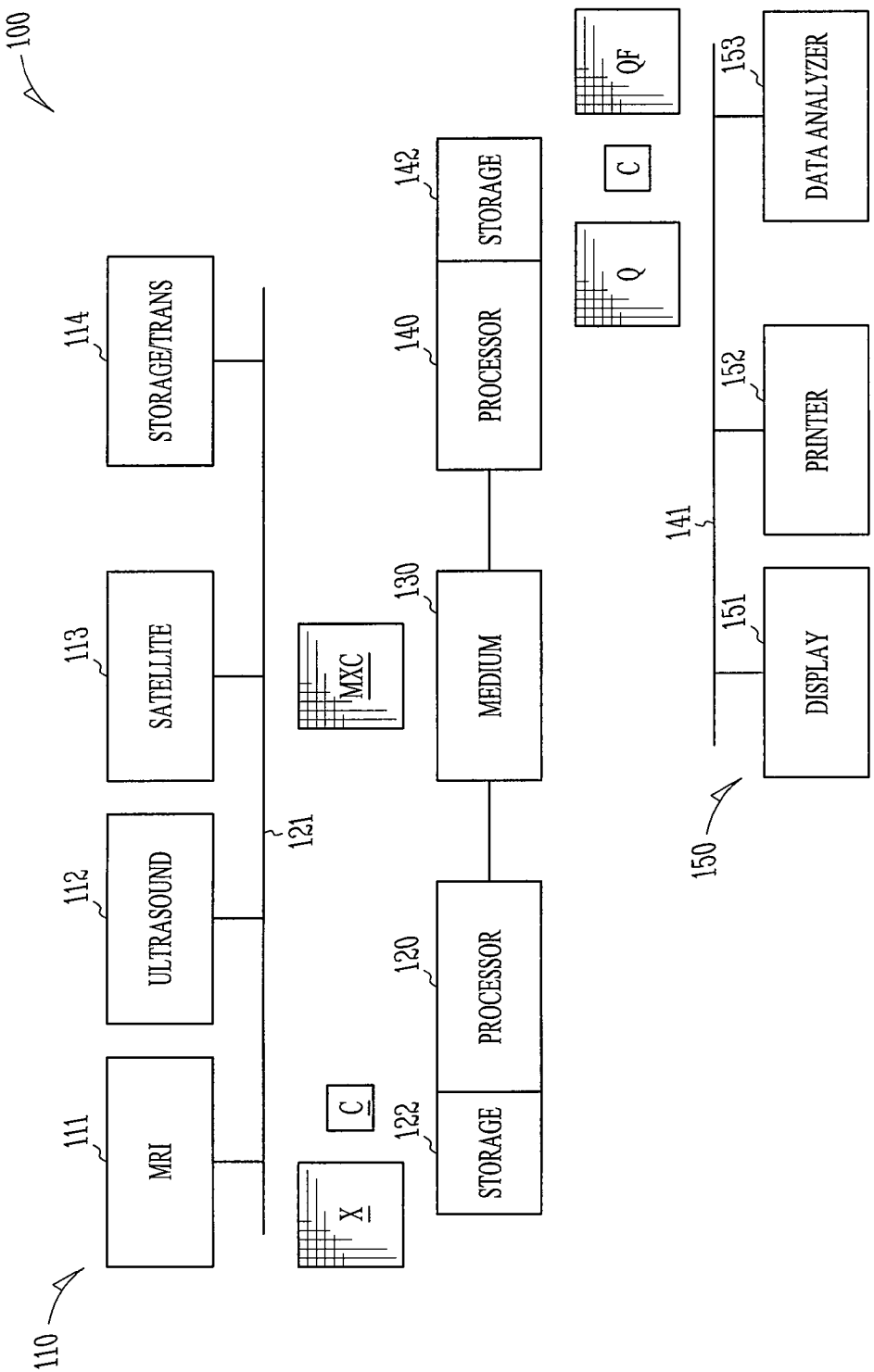
FIG. 1 is a block diagram of a system including different aspects of the invention, and includes diagrams of image data processed by the system.

FIG. 1 is a high-level schematic of an embodiment of a system 100 capable of hosting the invention. System 100 may be implemented in hardware, software, or a combination of both. Any of a number of source devices 110, such as magnetic-resonance imaging (MRI) scanner 111, ultrasound scanner 112, or satellite scanner 113 may produce the original image. Satellite water-vapor scanners, for example, produce frequency-domain images. Additionally, the original image may be retrieved from a storage device 114. A frequency-transform domain original image from one of the input devices 110 is represented as $\underline{X}(1 \ldots K_1, 1 \ldots K_2)$, having both magnitude and phase values 1 through $K_1$ in a first dimension and 1 through $K_2$ in a second dimension. Transform image $\underline{X}$ corresponds to an underlying original image in a spatial or other base domain, which is denoted as $X(1 \ldots N_1, 1 \ldots N_2)$ for an $N_1 \times N_2$ pixel image. In this example, the base-domain data points must have real values. However, complex-valued data can be treated as two sequences each having real values.

Although two-dimensional images are common, system 100 can process images in any number of dimensions. In particular, a two-dimensional image is usually treated as N ($N=N_1$ or $N_2$) separate one-dimensional pixel sequences $X_1$ $(1 \ldots K_1) \ldots X_N(1 \ldots K_1)$. Because the Fourier transform is separable, a two-dimensional image can be decomposed by rows or by columns, each row or column processed with a one-dimensional transform, and the N results stored as a two-dimensional transform $X(1 \ldots K_1, 1 \ldots K_2)$. This method offers considerable computational savings over direct two-dimensional processing.

The $K_1 \times K_2$ values of the transform-domain image components $\underline{X}$ are rational values to produce a lossless restoration. In a digital system, all representable values have a finite precision, and thus are effectively rational. Since all rational values can be considered as integers simply by changing representation scale, the terms "rational" and "integer" are treated as equivalent herein.

Processor 120 receives input image $\underline{X}$ over bus 121, and stores it in a storage facility 122, which may include internal storage and/or a removable medium for holding image $\underline{X}$ and program instructions for transforming and manipulating the image. Storage 122 also holds a marker quantity $\underline{C}$, which may comprise a single complex value, as explained below. Storage 122 further holds a modified transformed form $\underline{XC}$ of image $\underline{X}$. If the transform is a Fourier transform, $\underline{XC}$ has two complementary components, a magnitude $\underline{MXC}(1 \ldots K_1, 1 \ldots K_2)$ matrix and a phase $\underline{PXC}(1 \ldots K_1, 1 \ldots K_2)$ matrix. Only one of these components, the magnitude $\underline{MXC}$, is output to a communication medium 130. The complementary phase component $\underline{PXC}$ may be discarded. The term "communication" has a broad meaning herein; device 130 may include a medium for transmitting the image component, and/or for storing it for later restoration. In this embodiment, $\underline{MXC}$ is treated as the modified magnitude component of a discrete Fourier transform (DFT) of a two-dimensional spatial image $X(1 \ldots N_1, 1 \ldots N_2)$. Each pixel of the spatial image may represent a gray-scale amplitude, one or more color intensities, or any other characteristic, in any desired format.

Processor 120 sends the image magnitude component $\underline{MXC}$ to medium 130 for storage and/or transmission to processor 140. The magnitude component may be further encoded for storage or transmission if desired. An advantage of the present technique is its transparency to any form of lossless compression or encryption. For example, a lossless Lempel-Ziv-Welch (LZW) compression algorithm can be applied to $\underline{MXC}$, so as to achieve an additional 50% reduction of data volume.

Processor 140 receives transformed image component after transmission by and/or storage in medium 130. Processor 140 inverse transforms the communicated component, and removes a marker $\underline{C}$ in the base domain. marker C is equivalent to marker $\underline{C}$ in the transform domain, as explained below. Marker value(s) may be transmitted between the processors along with component $\underline{MXC}$, or may be made known to both processors in other ways. One possible way to communicate the marker value is to embed it within $\underline{MXC}$, in one or more locations where the data points are known to have very small values, such as the high-frequency DFT coefficients. For security, the marker location may be hidden, or it may be scrambled over several locations, making reconstruction difficult without a key. Difficulty of detection is enhanced if the real/imaginary or magnitude/phase values of the marker are embedded so as to maintain symmetry properties of the DFT.

Memory 142 stores a base-domain form C of embedded marker $\underline{C}$ along with the final restored base-domain image $QF(1 \ldots N_1, 1 \ldots N_2)$, as well as program instructions for restoring the image, as in any conventional processor. Processor 140 outputs final image Q on bus 141 to output devices 150. Examples of output devices include a display 151, a printer 152, and a data analyzer for further processing of the restored image.

Some applications may desire a transform-domain form of the restored image. Storage 142 includes this form as two arrays representing the magnitude $\underline{MQ}(1 \ldots K_1, 1 \ldots K_2)$ and phase $\underline{PQ}(1 \ldots K_1, 1 \ldots K_2)$ of the DFT-domain restored image. Because the phase component of the original transformed image was discarded before transmission or storage of the (modified) magnitude component, this restoration is known as phase retrieval.

FIG. 1 shows elements 110-122 as separate from elements 140-153. However, some applications may modify and store an image for restoration on the same computer at a later time. In such cases, only a single processor, storage, and/or bus are employed. Although the marker is normally embedded before communication, it could be embedded after the component is received or retrieved. System 100 may be realized as one or more general-purpose computers, as specialized systems, as elements embedded within other equipment, or in any other physical form appropriate for a particular application.

Figure 2:
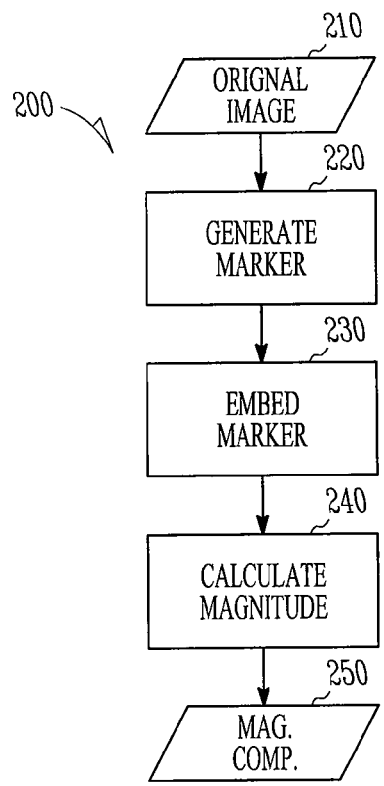
FIG. 2 is a flowchart showing an example of a method for modifying an original image for restoration.

FIG. 2 is a flowchart of an example method 200 for modifying a transform-domain image, representing an image in a spatial or other base domain, for communication as single component in the transform domain. For continuity of exposition, this example assumes a two-dimensional spatial image $X(1 \ldots N_1, 1 \ldots N_2)$ having pixels expressed as numbers that are rational in terms of a preselected precision. The precision may differ for different embodiments, or for different images in the same embodiment. Standard double-precision floating-point pixel values are assumed for this example, although integer and other floating-point representations are possible.

Block 210 receives an image from an image-generating device, a storage, or other input. Normally, this is already expressed in the transform domain, either because it is generated in that form or because it has been converted externally to that form. However, if an application prefers to convert it internally from a base-domain form $X(1 \ldots N_1, 1 \ldots N_2)$ to transform-domain $\underline{X}(1 \ldots K_1, 1 \ldots K_2)$, block 210 may also perform a conversion by way of a discrete Fourier transform (DFT) or other technique. The number of frequencies $K_1$ and $K_2$ in each dimension are selected according to known principles for an appropriate resolution in the restored image. Mathematically, $\underline{X}(1 \ldots K_1, 1 \ldots K_2) = \text{Re}[\underline{X}(1 \ldots K_1, 1 \ldots K_2)] + j\text{Im}[\underline{X}(1 \ldots K_1, 1 \ldots K_2)]$, the sum of real and imaginary components. These components are also called the Cartesian components of $\underline{X}$. In polar coordinates, the components are called the magnitude $\underline{MX}(1 \ldots K_1, 1 \ldots K_2)$ and the phase $\underline{PX}(1 \ldots K_1, 1 \ldots K_2)$. The real component is complementary to the imaginary component in that together they represent all of the information in the original base-domain image X; the magnitude component complements the phase for the same reason.

Block 220 generates a known marker value $\underline{C}$. For most applications, the marker is a single complex number, expressed in polar coordinates as a magnitude (or radius) $\underline{MC}$ and a phase $\underline{PC}$ such that $\underline{C} = \underline{MC}\exp(j\underline{PC})$, or equivalently in Cartesian form as the sum of real and imaginary parts, $\underline{C} = \underline{RC} + j\underline{IC}$ and is added to every element of $\underline{X}$. That is, the modified transform image $\underline{XC}(1 \ldots K_1, 1 \ldots K_2) = \{\text{Re}[\underline{X}(1 \ldots K_1, 1 \ldots K_2)] + \underline{RC}\} + j\{\text{Im}[\underline{X}(1 \ldots K_1, 1 \ldots K_2)] + \underline{IC}\}$, in Cartesian form. It is usually more convenient to set the marker radius as a function of the pixel values in the base-domain image $X(1 \ldots N_1, 1 \ldots N_2)$.

A convenient function for setting the marker radius is $\underline{MC} = A \times N_1 \times N_2$, an amplification factor A times the number of pixels in the underlying base-domain image. The pixel number may represent the size of the underlying base-domain image X, or the size or a largest image to be sent by a system, or in some other manner; these numbers can be approximate or estimated. The amplification factor A may be selected primarily from the maximum pixel magnitude $2^q$ of the underlying image X. Other possible factors include the precision of the numerical representations for the images, and rounding performed later in the process; the size of A may also be approximate or estimated. A safe lower bound lies in the neighborhood of $A = 2^q \times 10^2$. Another approximate empirical formula is $A = 10^5 / 2^q$. Other values are also feasible, up to several orders of magnitude higher, and lower to some extent. The amplification factor may be selected individually for each image, or may be fixed at one value for all images in a set or in a system. Maximum radius is not critical; it need only be low enough so as not to cause ambiguity in the pixel values of the restored image. The marker must be at least large enough to guarantee that the modified image is minimum-phase in the transform domain. Maximum value usually depends upon the available software or hardware floating-point precision.

The marker phase $\underline{PC}$ can assume any value except those near 0°, 90°, 180°, or 270°. As a practical matter, using standard floating-point processing, the phase should not lie within the range of ±1° from the four forbidden values. This range can be decreased if desired, by increasing the value of the marker radius $\underline{MC}$. $\underline{PC} = 45°$ is a convenient approximate value, and may simplify calculation in some instances.

For some ordinary applications, the marker $\underline{C}$ remains constant, so that block 220 merely retrieves it from storage for multiple images. Other environments may request block 220 to calculate a separate marker magnitude and/or phase for some or all images.

Block 230 embeds marker $\underline{C}$ within image $\underline{X}$ to produce a modified original image $\underline{XC}$. Where $\underline{C}$ has a single complex value, that value is added to every element of the transform image; in the Cartesian formulation, $\underline{XC}(1 \ldots K_1, 1 \ldots K_2) = \{\text{Re}\,[\underline{X}(1 \ldots K_1, 1 \ldots K_2)] + \underline{RC}\} + j\{\text{Im}\,[\underline{X}(1 \ldots K_1, 1 \ldots K_2)] + \underline{IC}\}$, where $\underline{C}$ is the sum of its real and imaginary components, $\underline{C} = \underline{RC} + j\underline{IC}$.

The transform-domain marker in this example represents the transform-domain equivalent of a delta functional in the base domain. Therefore, an base-domain marker $C = c\delta(n_1, n_2)$ could alternatively be applied to a pixel at location $X(n_1, n_2)$ of the base-domain image, if that image is available at the source. For an image formed as a sequence of discrete pixels, applying a delta functional amounts to adding a predefined constant value to only one of the existing pixels, conveniently to the first element, such as $X(1,1)$ in a two-dimensional image. More generally, it is possible to define markers as functions other than transform-domain constants or base-domain delta functionals.

Block 240 calculates the magnitude component of the modified transform-domain image from its real and imaginary parts as $\underline{MXC}(1 \ldots K_1, 1 \ldots K_2) = \{[\text{Re}\underline{XC}(1 \ldots K_1, 1 \ldots K_2)]^2 + \text{Im}\underline{XC}(1 \ldots K_1, 1 \ldots K_2)^2\}^{0.5}$, the square root of sum of the squares. Block 250 sends only the magnitude component $\underline{MXC}$ to medium 130, FIG. 1, for transmission and/or storage. If the marker $\underline{C}$ is redetermined for each image, its values may be sent along with the magnitude as, e.g., part of a file descriptor or header, or within the image data itself, as noted above.

FIG. 3 shows a computer program for carrying out a method 300 for modifying a base-domain image for communication as single component in a transform domain. The program is written in the Matlab® language, publicly available from The Math Works, Inc. The original input image may have any number of dimensions. The variable names are explained in the figure.

Figure 4:
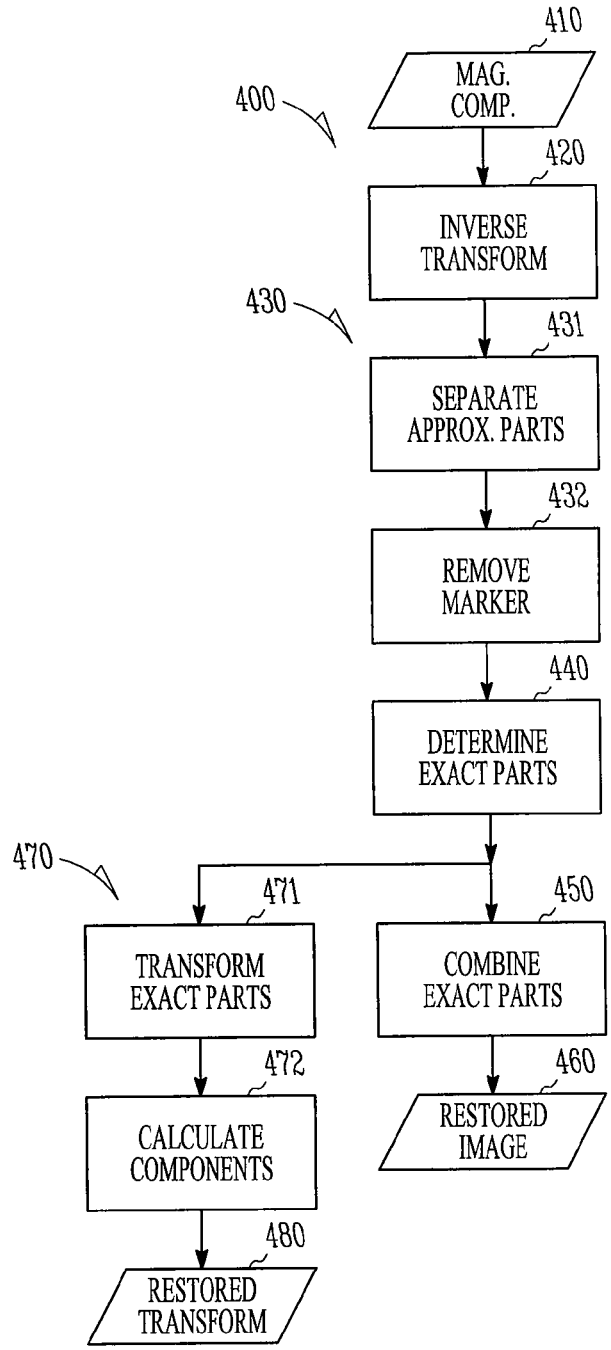
FIG. 4 is a flowchart showing an example of a method for restoring a modified image from a single transform-domain component.

FIG. 4 is a flowchart showing an example of a method 400 for restoring a modified image from a single transform domain component. Block 410 receives the magnitude component $\underline{MXC}$ from medium 130, FIG. 1. Block 420 performs an inverse DFT or other transform upon $\underline{MXC}$ to produce an approximate restored image $QAC(1 \ldots N_1, 1 \ldots N_2)$ in the base or spatial domain.

Blocks 430 correct for the marker added in methods 200 and 300 above. Block 431 separated QAC into an even part EQAC and an odd part OQAC. Mathematically, $EQAC(1 \ldots N_1, 1 \ldots N_2) = [QAC(1 \ldots N_1, 1 \ldots 1)]/2$. $QAC(N_1 \ldots 1, N_2 \ldots 1)$ is generated by reversing $QAC(1 \ldots N_1, 1 \ldots N_2)$ and shifting it circularly one place to the right. The following section gives an example of this procedure; it is a conventional block in most digital signal processor (DSP) integrated circuits. The corresponding odd sequence is $OQAC(1 \ldots N_1, 1 \ldots N_2) = [QAC(1 \ldots N_1, 1 \ldots 1)]/2$.

Block 432 subtracts the base domain equivalent form C of the marker from the even part. In this example, C represents a delta function to be subtracted from the first pixel location {1,1}, so block 432 performs $EQA(1,1) = EQAC(1,1) - \underline{MXC}$. The even part is then scaled to remove the marker phase "$EQA(1,1 \ldots N_1, 1 \ldots N_2) = EQAC(1 \ldots N_1, 1 \ldots N_2)/\cos(PC)$. Because the first element of the odd part is zero when pixels have real values, no subtraction need be undertaken, and the odd part must only be scaled for the marker phase $\underline{PC}$, by $OQAC(1 \ldots N_1, 1 \ldots N_2)/\sin(\underline{PC})$.

Block 440 resolves the approximate parts to produce exact quantities for restoring the original pixel values from their property of having rational values. The even part is rounded to create an exact or final even part $EQ(1 \ldots N_1, 1 \ldots N_2) = \text{Rational}[EQA(1 \ldots N_1, 1 \ldots N_2)]$. In this example, the function $\text{Rational}(V) = [\text{Integer}(2 \times 10^d \times V)]/(2 \times 10^d)$, where d is the number of decimal places in the representation of its argument V; equivalent functions for binary or other number representations are easily defined. The purpose of this function is to convert a value that lies halfway between two possible values of a pixel in the original image into the correct one of those values; the following section explains why this operation produces exact pixel values. Other functions that achieve this result are also acceptable. Block 440 operates similarly upon the odd part to produce an exact odd part $OQ(1 \ldots N_1, 1 \ldots N_2) = \text{Rational}[OQA(1 \ldots N_1, 1 \ldots N_2)]$.

Block 450 combines the exact even and odd parts to produce the final restored image $$Q(1 \ldots N_1, 1 \ldots N_2) = EQ(1 \ldots N_1, 1 \ldots N_2) + OQ(1 \ldots N_1, 1 \ldots N_2).$$

Block 460 then outputs Q as the final restored image having pixel values that are the same as those in the original image $X(1 \ldots N_1, 1 \ldots N_2)$ for a lossless reconstruction.

Some applications may wish to reconstruct the full transform-domain image in addition to—or even instead of—the base-domain image Q. Blocks 470 carry out this task. Block 471 calculates the real part of the restored transform-domain image $$\underline{RQ}(1 \ldots K_1, 1 \ldots K_2) = DFT[EQ(1 \ldots N_1, 1 \ldots N_2)]$$

and the imaginary part $$\underline{IQ}(1 \ldots K_1, 1 \ldots K_2) = DFT[OQ(1 \ldots N_1, 1 \ldots N_2)].$$

Block 472 computes the retrieved phase component as $$PQ=\arctan[IQ(1\ldots K_1,1\ldots K_2)/RQ(1\ldots K_1,1\ldots K_2)].$$

Because the received magnitude MXC contains the embedded marker value, block 472 computes the true magnitude component $$MQ=SQRT\{RQ(1\ldots K_1,1\ldots K_2))^{\wedge}2+IQ(1\ldots K_2))^{\wedge}2\}.$$

These calculations could produce polar-coordinate forms instead of the Cartesian forms described. Block 480 outputs the two arrays RQ and IQ or polar-coordinate magnitude and phase, if desired.

FIG. 5 shows a computer program for carrying out a method 500 for restoring an image communicated as a single component in a transform domain. The program is written in the Matlab® language. The transform image component may have any number of dimensions. The variable names are explained in the figure. The quantity eps in the code is the smallest number representable by the system, to forestall computational artifacts; other implementations may not require it.

Explanation of Operation

The foregoing describes a representative form of communicating only one component of a transform-domain image, and then restoring the entire image in a closed form—i.e., without iteration. This section demonstrates why the restoration can be lossless. The text refers to numbered equations in FIG. 6. Without loss of generality, this section assumes restoration from a magnitude component, one-dimensional sequences, zero-origin indices, and integer data-sequence values, for clarity of exposition. Complex numbers Z are represented interchangeably in the equivalent Cartesian form Z=ReZ+jImZ and polar or magnitude/phase form Z=(MagZ)×exp(−jPhZ), where j=$\sqrt{-1}$ and "exp" denotes the exponential function.

Eqn. 601 defines each term $\underline{X}$(k) of the forward or analysis discrete Fourier transform (DFT) of an N-point sequence having data values X(n), 0≦n≦N−1. Eqn. 602 shows the inverse or synthesis form of the DFT. Each term $\underline{X}$(k) is a complex quantity in the frequency or transform domain, and can be represented in either form of Eqn. 603. R and I prefixes denote complementary real and imaginary components; M and P denote complementary magnitude and phase components.

A number of transforms, including the DFT, have the linearity property of Eqn. 604, where $X_1$, $X_2$ are any two N-point sequences in a base domain, and a, b are simple scalar constants.

A property of any sequence X is that it can be represented as the sum of an even sequence EX and an odd sequence OX, both having N points. Eqn. 605 defines the terms EX(n) of the even sequence. The notation X(−n) signifies the nth term of a sequence that is reversed and circularly shifted one place to the right from the original sequence X. For example, an original sequence {1, 3, 5, 2, 4, 6} is reversed and shifted to {1, 6, 4, 2, 5, 3}, and its even sequence becomes {1, 4.5, 4.5, 2, 4.5, 4.5} according to Eqn. 605. The DFT of any even sequence is entirely real (i.e., not complex-valued), and equals the real part of the full original sequence, as shown in Eqn. 606. Eqn. 607 defines the odd sequence terms OX(n). The odd sequence in the above example is {0, −1.5, 0.5, 0, −0.5, 1.5}. The DFT of any odd sequence is entirely imaginary, and equals the imaginary part of the original sequence, Eqn. 608.

Eqns. 605 and 607 demonstrate that, if a sequence has only integer values, then the even and odd sequences consist entirely of integer or half-integer values. Extending this property from integer to rational values reveals that, to any selected scale of a digital number representation, the even and odd sequence values are either exact at that scale or halfway between two exact units.

The form of a delta functional or impulse for discrete sequences has an amplitude C for only one of the sequence elements—usually taken to be the first element—and is zero for all other elements. The DFT of a delta in the base domain is a complex constant C that is the same for all frequencies k, and has a value given by Eqn. 609. Eqn. 610 shows the polar and Catesian forms of C. MC is the marker magnitude or radius; PC is the marker phase. Because of the linearity property of the DFT, Eqn. 604, adding a delta distribution to a base-domain sequence X, Eqn. 611, is is equivalent to adding the constant C to every term of the sequence's DFT $\underline{X}$, Eqn. 612.

Eqn. 613 calculates the magnitude component MXC for each term of the modified DFT image XC. This magnitude may be stored or transmitted by itself for lossless restoration of the original base-domain image X, or of the entire transform-domain image $\underline{X}$.

Restoration of the original image X from only the component MXC employs the DFT properties of even and odd sequences shown in Eqns. 606, 608, and the previously noted fact that a function is the sum of its even and odd parts. Eqn. 614 applies an inverse DFT which, by Eqn. 606, produces a sequence of base-domain terms EQAC(n) that represent an even sequence for restoring the original image. Eqn. 615 produces a sequence of terms OQAC(n) representing a corresponding odd sequence in the base or spatial domain.

Sequences EQAC and OQAC still contain a base-domain form C of the transform-domain marker C added in Eqn. 612. In this example, the transform-domain marker C was applied to correspond to a base-domain delta functional of amplitude C at the first image location; that is, XC(0)=X(0)+C. The marker magnitude only affects the even sequence, and thus need be subtracted only from that part in Eqn. 616. The divisor, cos(PC), removes the known phase PC of the marker. Eqn. 617 removes the marker phase from the odd sequence with divisor sin(PC). Restricting the marker phase away from the vicinity of the zeros of these two divisors prevents them from introducing overrun or divide-by-zero faults in a digital processor.

For sufficiently large marker values, Eqns. 616 and 617 produce even and odd sequences EQA and OQA that are very close to—but not exactly—the even and odd parts of the restored image. The difference from the true sequence-element values arises from the possible introduction of half-integer values into the even and odd sequences by Eqns. 605 and 607. However, the restriction of the original sequence elements to integer values allows the half-integer items to be found and corrected. Eqns. 618 and 619 produce exact, integer even and odd sequences EQ and OQ from the approximate sequences EQA and OQA respectively. The second form of Eqns. 618 and 619 may be used for pixel values having any finite number d of decimal points.

Finally, because any function is the sum of its even and odd parts, Eqn. 620 yields the pixel terms of the lossless restored image, Q=X.

Restoring the magnitude and phase components then follows from the definitions of those components in Eqn. 603.

After transforming the restored base-domain image DFT (Q)=$\underline{RQ}$+j$\underline{IQ}$, Eqn. 621 calculates terms of the restored magnitude component $\underline{MQ}$=$\underline{MX}$, and Eqn. 622 calculates terms of the phase $\underline{PQ}$=$\underline{PX}$.

Restoration from Phase Component Only

FIG. 7 is a flowchart of an example method 700 for modifying an image in a spatial or other base domain for communication as a single phase component in the transform domain, instead of using the magnitude component as in method 200. Block 711 transforms the image to the transform domain, here again by a discrete Fourier transform. Although the marker could have been added in the base domain, block 720 generates or selects a transform-domain marker of value C having a magnitude R, determined in substantially the same way as previously described in connection with marker $\underline{MC}$ in method 200, FIG. 2, above. The marker is complex, having a phase arbitrarily set to 45°. Block 730 embeds the marker by adding it to every element of the transformed original image. Block 740 calculates the phase component, and block 750 communicates (transmits or stores) only the phase component as a representation of the entire modified image.

FIG. 8 is a Matlab® program 800 for modifying an image for communication as only a phase component in the transform domain. The code sets a marker value C having a magnitude R and a complex phase phi=45°. An array PXIC(1 . . . $K_1$,1 . . . $K_2$), representing the phase elements of the modified image XIC(1 . . . $K_1$,1 . . . $K_2$) may then be communicated—i.e., transmitted and/or stored—on a medium such as 130, FIG. 1.

FIG. 9 is a flowchart of an example method 800 for recovering or restoring the modified image from phase component 750, FIG. 7, shown in FIG. 9 as block 910. The marker magnitude and phase may also be acquired here if desired. Block 920 forms a complex discrete Fourier transform from the phase component, and block 930 performs an inverse transform, producing a base-domain image. Block 940 removes the marker from its known pixel location(s) in the image. Alternatively, the transform-domain version of the known marker could be removed before the inverse transform of block 930. Block 950 calculates the real part of the approximate restored image. Block 960 calculates the exact form of the restored image similarly to block 440, FIG. 4. Here again, the entire transformed version, including the magnitude component, of the restored image could be calculated if desired.

FIG. 10 shows a Matlab® program 1000 for restoring an image from a phase component, according to method 900. After inverse-transforming this component, the program removes the marker phase phi and magnitude (radius) R from the base-domain form JC. After calculating the real part of the image J(1 . . . $N_1$,1 . . . $N_2$) from which the marker has been removed, the program applies the procedure described in connection with method 200 for producing the exact pixel values of the restored image in the base domain.

Restoration from Sign-Magnitude Component

FIG. 11 is a flow chart of a method 1100 for modifying a transform-domain image for communication as a single component in the transform domain. This example describes a one-dimensional row or column of an image X(1 . . . N)=ReX(1 . . . N)+jImX(1 . . . N), which may have multiple dimensions. The base-domain pixels are numbers that are rational in terms of a preselected precision, which may differ for different embodiments.

Block 1110 receives the image from an image-generating device, a storage, or other input. Normally, this is already expressed in the transform domain, as $\underline{X}(1 \ldots K)$=$Re\underline{X}(1 \ldots K)$+$jIm\underline{X}(1 \ldots K)$=$\underline{MX}(1 \ldots K)\exp(j\underline{PX}(1 \ldots K))$, in Cartesian or polar coordinates. However, it could be received in the base domain and transformed in block 1110; the remainder of method 110, and all of method 1300 below, would remain unaffected.

Block 1120 generates a known marker having a strictly real value of magnitude $\underline{C}$. Appropriate values of $\underline{C}$ may be selected as described in connection with method 200, FIG. 2.

Block 1130 embeds marker $\underline{C}$ within image $\underline{X}$ to produce a modified original image $\underline{XC}(1 \ldots K)$={$Re[\underline{X}(1 \ldots K)]$+$C$}+$j${$Im[\underline{X}(1 \ldots K)]$}.

Because $\underline{C}$ is real, the imaginary part of $\underline{X}$ remains unchanged. The marker in this example represents the transform-domain equivalent of a delta functional in the base domain. As in method 200, a base-domain marker C=c$\delta(n_1, n_2)$ could alternatively be applied to a pixel at location X($n_1, n_2$) of the base-domain image, if that image is available at the source. For an image formed as a sequence of discrete pixels, applying a delta functional amounts to adding a predefined constant value to only one of the existing pixels, conveniently to the first element, such as X(1) in a one-dimensional image, or a row or column of a two-dimensional image. Again, markers may be functions other than transform-domain constants or base-domain delta functionals.

Block 1140 calculates both the magnitude and phase of the modified transform-domain image from its real and imaginary parts. The magnitude component is $\underline{MXC}(1 \ldots K)$=[{$Re[\underline{XC}(1 \ldots K)]$}^2+{$Im[\underline{XC}(1 \ldots K)]$}^2]^0.5.

The phase component is $\underline{PXC}$=arctan{$Im[\underline{XC}(1 \ldots K)]$/$Re[\underline{XC}(1 \ldots K)]$}.

Block 1150 generates a sign map of XC. This quantity is defined as $\underline{map}(1 \ldots K)$ =1−2×[$\underline{PXC}(1 \ldots K)$<0]. That is, each element of $\underline{map}$ has a value of +1 or −1 depending upon whether the corresponding element $\underline{PXC}$ has a phase that is negative or non-negative. Block 1160 embeds elements of the sign map into corresponding elements of the magnitude component, $\underline{SMXC}(1 \ldots K)$=$\underline{map}$*$\underline{MXC}$, where the asterisk denotes term-by-term multiplication.

Block 1170 then sends only the magnitude component $\underline{SMXC}$ to medium 130, FIG. 1, for transmission and/or storage, and sends with it the sign map $\underline{map}$. Again, if the marker $\underline{C}$ is redetermined for each image, its value may be sent along with the signed-magnitude component.

FIG. 12 shows a Matlab® program for an example of a program 1200 for modifying an original image for communication as a single signed-magnitude component in a transform domain. The variable names are noted in the figure.

FIG. 13 illustrates a method 1300 for restoring an original base-domain image from only a signed-magnitude component. Block 1310 receives the signed magnitude component $\underline{SMXC}(1 \ldots K)$ from medium 130, FIG. 1. Block 1320 extracts the sign map from the sign of the component, map (1 . . . .K)=1−2×[$\underline{SMXC}(1 \ldots K)$<0]. Block 1330 calculates the component's magnitude $\underline{MXC}$=|$\underline{SMXC}$|=[$Re\underline{SMXC}(1 \ldots K)$^2+$Im\underline{SMXC}(1 \ldots K)$^2]^0.5.

Block 1340 expands the magnitude by one place of accuracy, in this example one decimal place, in the base domain of the image. Inverse transforming, EQA=ifft(MXC). Then the base-domain part acquires an extra place, Integer(2×EQA)/2=EQA. This quantity is then converted back to the transform domain, Re(XC)=fft(EQA).

Block 1350 restores the phase of the image. The raw phase is calculated as $$PXC = \arccos[Re(XC)/MXC].$$

Then the map supplies the actual phase, $$PSXC(1 \ldots K) = map(1 \ldots K) * PXC(1 \ldots K).$$

Again, the asterisk denotes term-by-term multiplication.

Block 1360 produces a base-domain image from the entire transform form, QCA=ifft[MXCexp(jPXC)].

Block 1370 removes the marker as in method 200, QA(1)=QCA−C. When the marker is a delta functional, its value is subtracted only from the base-domain element where it was applied—the first element, in this example.

Block 1380 produces the exact base-domain image by rounding the approximate form, Q(1 . . . K)=Integer[QA(1 . . . K)]. This image has the exact element values of the original image in its base-domain form. For example, if the transform image received in block 1110 represented a 256-level gray-scale image in the base domain, then restored image Q has exactly the same accuracy. Block 1390 stores or transmits this restored image Q for output or further processing.

FIG. 14 shows a program 1400 for restoring the original image from a signed magnitude component. In this example, the original input image has two dimensions, and is received in the base domain, so that the original and restored images may be compared.

Complex Image Pixels

Previously described methods assumed that the pixels in the original image have only real values. Some applications, however, produce pixels that have complex values. Synthetic-aperture radars, seismic analysis, and some medical imaging, for example, produce transform-domain images that translate back to a spatial or other domain as complex-valued pixels. In addition, there are applications in which the ability to process complex pixel values is advantageous even when the actual pixel values are strictly real.

FIG. 15 is a flow chart of an example method 1500 for modifying such an image for communication as a single component in the transform domain, where the original image-pixel values may assume complex values. Block 1510 represents an original input image having complex pixel values in a base domain. Although the image may have any number of dimensions, this example focuses upon a two-dimensional matrix of pixels $I(n_1,n_2) = I_1(n_1,n_2) + j\, I_2(n_1,n_2)$, representing the real and imaginary parts. Block 1511 transforms the base-domain image to a transform-domain image $X(k_1,k_2) = fft_2(I(n_1,n_2))$. If the original image arrives in transform-domain form, block 1511 is not needed. Unless otherwise from the context, equations are expressed in the syntax of the aforementioned Matlab® language.

Block 1520 generates a sign map similarly to block 720, FIG. 7; because this example method employs other maps as well, this map is called a phase map. Block 1520 calculates the phase component $PX(k_1,k_2)$ of the transformed image and constructs a binary-valued map $SGN_1(k_1,k_2)$ having one value (e.g., "1") where the phase has a negative value, and another value (e.g., "0") where the sign of the phase is positive.

Block 1530 generates a real-valued marker, similarly to block 730. An amplification factor may be employed, as mentioned previously, to ensure minimum phase of the modified image in the transform domain. This factor may be based upon the image pixel values, or may be a constant. Typical markers may be $C = \alpha\, N_1 N_2$, where $\alpha = 10^4$ to $10^8$. Block 1540 embeds the marker as described previously, and block 1550 calculates the magnitude component of the thus modified image, $MXC(k_1,k_2) = |X(k_1,k_2) + C|$.

Blocks 1560 may be added to reduce image storage requirements in another way, by reducing the storage required for individual matrix values in the magnitude component. Block 1561 reduces the highest values of the matrix elements by subtracting the large marker value from every element, $MXC1_{k_1,k_2} = MXC(k_1,k_2) - C$. Because the resulting element values may be negative as well as positive, block 1561 then generates a sign map $SGN_2(k_1,k_2)$ having one value (e.g., "1") for elements having a negative value—i.e., below a threshold value of 0—and another value (e.g., "0") for positive elements, above 0 or some other threshold. Block 1562 reduces storage by allowing each matrix element of the magnitude component to occupy a variable number of bytes of storage. Block 1562 first computes the absolute values of the individual elements, $MXC1(k_1,k_2) = |MXC1(k_1,k_2)|$, and rounds them to the nearest integer. Block 1562 then generates a location map or byte-length map $$BYTE(k_1,k_2) = \text{ceiling}\,(|\log 2(MXC1(k_1,k_2))/8|).$$

Each matrix element thus indicates how much storage is required for the corresponding element of MXC1. In this example, each element of BYTE has three bits, indicating that one through eight bytes may be used for each element of MXC1. This allows each of the elements of the magnitude matrix $MXC1(k_1,k_2)$ to be stored with variable byte lengths, rather than requiring the same storage for each element, regardless of its actual magnitude. Storage units other than bytes may be employed here if desired. Although blocks 1560 add overhead, the storage/bandwidth savings may outweigh it in many cases.

Block 1570 packages the three maps $SGN_1(k_1,k_2)$, $SGN_2(k_1,k_2)$, $BYTE(k_1,k_2)$ along with the magnitude component $MXC1(k_1,k_2)$. The maps may be embedded in the image itself, sent as separate files, or packaged in any other convenient manner. As before, the value of the marker C (or $\alpha$, $N_1$, $N_2$), as well as other information such as an image name, may be included if desired. Block 1580 represents the total package that is communicated—i.e., transmitted or stored for future restoration.

FIG. 16 depicts a method 1600 for restoring an original complex-valued base-domain image from a signed-magnitude transform-domain component 1610 such as that communicated in a medium 130, FIG. 1, from block 1580, FIG. 15. Block 1620 extracts the maps $SGN_1(k_1,k_2)$, $SGN_2(k_1,k_2)$, $BYTE(k_1,k_2)$, and possibly other data, packaged along with th magnitude component MXC1. The phase (sign) and magnitude maps may be converted to a form that is more useful in this particular example, $MAP_1(k_1,k_2) = 1 - 2*SGN_1(k_1,k_2)$ and $MAP_2(k_1,k_2) = 1 - 2*SGN_2(k_1,k_2)$. Block 1630 reconstitutes the full magnitude component from the compressed form in which it was communicated to block 1610. Location map $BYTE(k_1,k_2)$ may optionally expand the variable-byte form by known methods to a form having the same number of bytes per element, for easier computation in later stages. The marker value subtracted in block 1561 is restored as MXC$(k_1,k_2)$=MXC1$(k_1,k_2)$+C.

Block 1640 calculates the real part of the restored transform-domain image. The marker is partially removed in the base domain during this process, as indicated at 1641. The even part of the base-domain image is Jev$(n_1,n_2)$=ifft$_2$(MXC). An operation Jev(1,1)−Cremoves the base-domain form of the real-valued marker, indicated as block 1641. The real part of the transform-domain image is RX=real (fft$_2$(Jev)).

Block 1650 calculates the imaginary part of the restored transform-domain image—that is, restores the phase of the original image. Consider the following derivation of the imaginary part IX from MXC, the modified magnitude:

$$MXC^\wedge 2 = (RX + C)^\wedge 2 + IX^\wedge 2$$
$$\therefore IX^\wedge 2 = MXC^\wedge 2 - (C + RX)^\wedge 2$$
$$= (MXC - (C + RX)) * (MXC + (C + RX))$$
$$= (MXC - C - RX) * (MXC + C + RX)$$
$$= C^\wedge 2 * (MXC/C - 1 + RX/C) *$$
$$(MXC/C + 1 + RX/C).$$
Defining $AN \equiv MXC/C - 1 + RX/C$ and
$$AP \equiv MXC/C + 1 + RX/C,$$
$$IX = C * \text{sqrt}(AN) * \text{sqrt}(AP)$$

This computation differs somewhat from earlier phase restoration in order to retain accuracy of the element values in view of precision limitations in the data processor, because MXC and C are very large numbers. AN should have all positive values. Block 1650 sets any slightly negative values due to precision shortcomings are to zero by AN=(AN>0).*AN. The correct (bipolar) version of IX is not needed in this example. If desired, the algebraic signs of the IX elements may be corrected by reintroducing the sign map, noted at block 1661. The correction is IX=IX.*RMAP.*MAP$_1$, where RMAP=1−2*(RX<0). The purpose of RMAP is to correct the signs that might have been changed due to precision errors.

Block 1660 combines the real and imaginary parts to find the complete transform-domain restored image. In polar coordinates, the magnitude of the final transform-domain image then becomes MX=sqrt(RX$^\wedge$2+IX$^\wedge$2), and the phase is PX=MAP$_1$.* arccos(RX/MX). Again, MAP$_1$ reintroduces the sign-map correction, indicated at block 1661. If Cartesian coordinates Y are desired, the transform-domain image expression is Y$(k_1,k_2)$=RX$(k_1,k_2)$+j IX$(k_1,k_2)$.

Block 1680 takes an inverse discrete Fourier transform to produce the base-domain restored image J$(k_1,k_2)$=ifft$_2$(Y). If only the transform-domain restored image is required, block 1680 may be omitted.

In methods 1500 and 1600, the marker value C had a strictly real value. Modifications to those methods, however, would allow imaginary marker values, generated in the same way as the real values. In block 1550, however, magnitude MXC$(k_1,k_2)$ would become MXC$(k_1,k_2)$=|X$(k_1,k_2)$+j C|.

In method 1600, for an imaginary marker, the inverse transform of the magnitude matrix MXC$(k_1,k_2)$ produces an approximation to the odd portion Jod$(n_1,n_2)$ of the complex image I$(n_1,n_2)$, and the imaginary marker value C is subtracted from the appropriate element of the complex matrix. Where the marker resides in the first pixel, Jod(1,1)=Jod(1,1)−j C. The imaginary part IX$(k_1,k_2)$ of the complex transform becomes IX=−imag (fft$_2$(Jod)). The matrix j IX$(k_1,k_2)$ is imaginary and bipolar, so a sign map may be calculated as IMAP$(k_1,k_2)$=1−2 *(IX<0). The real part RX$(k_1,k_2)$ of the of the complex transform matrix X$(k_1,k_2)$ remains the same. Retaining element precision here favors a slightly different computation: BN=MXC/C−1+IX/C. Again, any slightly negative values are set to zero by BN=(BN>0).*BN. BN corresponds to AN, above. BP=MXC/C+1+IX/C. corresponds to AP. The magnitude of the RX$(k_1,k_2)$ may then be computed as RX=C*sqrt(BN).*sqrt(BP). The bipolar matrix version of the RX$(k_1,k_2)$, if needed, is RX=IMAP.*MAP$_1$.*RX. Block 1660 would calculate the phase component as PX$(k_1,k_2)$=MAP$_1$.*arcsin(IX/MX). Otherwise, the operations may be the same as described in connection with FIGS. 15 and 16.

Complex image elements, whether transform or base domain, are frequently expressed in single- or even double-precision floating-point notation from the beginning. Therefore in many cases an exact restoration down to the bit level is questionable. However, if the original image elements X$(k_1,k_2)$ are—or can be considered to be—integer values, then the rounding techniques described in connection with methods 400 and 800 may be employed in method 1600 as well. Although the storage-reduction blocks in methods 1500 and 1600 are especially useful in high-precision image processing, they may be incorporated in nay of the other methods as well.

FIG. 17 shows an application of methods capable of modifying and restoring complex-valued images. Method 1700 modifies, communicates, and restores a pair of independent real-valued images as a single component of a single image. Original images 1711 and 1712 may comprises images of any type, as long as their pixels or other elements do not have complex values. These will be termed "real-valued" pixels, although their elements could be strictly imaginary or represent any other single value. They are symbolized herein as I1$(n_1,n_2)$ and I2$(n_1,n_2)$.

Block 1720 converts one of the images to have imaginary pixel values, j*I2$(n_1,n_2)$. Block 1730 then combines the images into a single image having complex pixel values, I$(n_1,n_2)$=I1$(n_1,n_2)$+j*I2$(n_1,n_2)$. That is, each pixel of image 1711 become the real part of a pixel of the combined image, and each pixel of image 1712 becomes the complex part of a corresponding pixel in the combined image. These terms may include Cartesian angles other than 0° and 90°, or magnitude and phase, or any other pair of mutually orthogonal complex representations.

Block 1740 modifies the combined image I$(n_1,n_2)$ to produce a single component (magnitude or phase) 1750, which has the storage and bandwidth requirements of other modified images described above. This component may be communicated by transmission or storage on a medium such as 130, FIG. 1.

Block 1760 retrieves the single component and restores it according to methods such as 800 described above to produce the original combined image I$(n_1,n_2)$. Block 1770 separates the restored image into its real and imaginary parts, ReI$(n_1,n_2)$ and ImI$(n_1,n_2)$. Block 1780 reconverts the imaginary part to real values, if necessary, say as I2$(n_1,n_2)$=ImI$(n_1,n_2)$/j.

Blocks 1791 and 1792 represent the restored images $I1(n_1, n_2)=\text{Re}I(n_1,n_2)$, and $I2(n_1,n_2)=\text{Im}I(n_1,n_2)/j$.

CONCLUSION

Embodiments of the invention offer methods and systems for communicating images efficiently by reducing storage space and transmission time/bandwidth. Images may have any number of dimensions or formats, the term "image" herein is not limited to spatial images, and may include any sequence of data that is representable in an appropriate form. Complex or other multi-part element values may be accommodated. Any of the embodiments may process an original image that is presented either in a base domain or in a transform domain. Transforms other than DFT may be employed. The invention may be used along with other compression methods, and is transparent to them.

The foregoing description and drawing illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary, or may be performed in parallel. Portions and features of some embodiments may be included in or substituted for those of others. Items in lists are not exclusive, and may also be combined in any way. The Abstract is provided solely as a search aid, and is not to be used for claim interpretation. The scope of the invention encompasses the full ambit of the following claims and all available equivalents.

The invention claimed is:

1. A method for processing an original image, comprising:
    using a processor to perform:
    selecting a known marker value related to predetermined data in the original image;
    placing the marker value at a known location with respect to the original image so as to modify the image data;
    if the original image is in a base domain, transforming the original image and the marker value at the known location to multiple complementary components having minimum phase in a transform domain;
    communicating only one component of the multiple complementary components as a modified image;
    receiving the one component for restoration;
    generating in a closed form, without iteration a plurality of sequences from the one component;
    removing the predetermined marker data from the marker location;
    combining the sequences to produce an entire restored image.

2. The method of claim 1 where the marker value is sufficient to ensure that the component is minimum-phase.

3. The method of claim 2 where the marker value is complex.

4. The method of claim 1 where elements of the original image are complex in the base domain.

5. The method of claim 4 where the original image is a composite of two independent images.

6. A computer-readable medium for storing program instructions for carrying out the method of claim 1.

7. A system for processing an original image, comprising:
    a first digital processor for
        selecting a known marker value related to predetermined data in the original image,
        placing the marker value at a known location with respect to the original image so as to modify the image data,
        if the original image is in a base domain, transforming the original image and the marker value at the known location to multiple complementary components having minimum phase in a transform domain;
    a first storage associated with the first processor for storing at least one of the components;
    a channel for communicating only one component of the multiple complementary components;
    a second digital processor for
        receiving the one component for restoration,
        generating in a closed form, without iteration a plurality of sequences from the one component,
        removing the predetermined marker data from the marker location;
        combining the sequences to produce an entire restored image;
    a second storage associated with the second processor for storing the received one component.

8. The system of claim 7 where the channel transmits the one component from the first processor to the second processor.

9. The system of claim 7 where the channel comprises a storage medium for storing the one component.

10. The system of claim 7 further comprising an input device for producing the original image.

11. The system of claim 7 further comprising an output device coupled to the second storage for receiving the restored image.

12. A method for processing image data representing an original image in a base domain for subsequent restoration, comprising:
    using a processor to perform:
    selecting a known marker value related to predetermined data in the original image, where the marker value is not strictly real;
    placing the marker value at a known location with respect to the original image so as to modify the image data in the base domain;
    transforming the original image including the modified image data to a transform domain having multiple complementary components and having minimum phase;
    communicating less than all of the components as a modified image.

13. The method of claim 12 where the marker is placed in the image directly in the base domain.

14. The method of claim 12 where the marker is placed directly in at least one of the complementary components.

15. The method of claim 12 where the phase of the marker is at least 1° away from 0°, 90°, 180°, and 270°.

16. The method of claim 15 where the marker phase is about 45°.

17. The method of claim 15 where the marker phase is strictly imaginary.

18. A computer-readable medium for storing program instructions for carrying out the method of claim 12.

19. A system for processing image data representing an original image in a base domain for subsequent restoration, comprising:
    a processor for
        selecting a known marker value related to predetermined data in the original image, where the marker value is not strictly real, placing the marker value at a known location with respect to the original image so as to modify the image data in the base domain, transforming the original image including the modified image data to a transform domain having multiple complementary components and having minimum phase;

a channel for communicating less than all of the components as a modified image.

20. The system of claim 19 further including a source device for producing the original image.

21. The system of claim 20 where the source device comprises at least one of a scanner and a storage device.

22. The system of claim 19 where the channel transmits the less than all of the components from the processor to a network.

23. The system of claim 19 where the channel comprises a storage medium for storing the less than all of the components.

24. A method for processing an original image in a transform domain having multiple components for subsequent restoration, comprising:

using a processor to perform:

selecting a known marker value in a base domain related to predetermined data for the original image in the base-domain, where the marker value is not strictly real;

manipulating the original image entirely within the transform domain so as to place data therein representing a transform of the known base-domain marker value at a known location in the base-domain;

communicating less than all of the components of the manipulated image as a modified image;

where the phase of the marker is at least 1° away from 0°, 90°, 180°, and 270°.

25. The method of claim 24 where the marker phase is about 45°.

26. The method of claim 24 where the marker phase is strictly imaginary.

27. A computer-readable medium for storing program instructions for carrying out the method of claim 24.

* * * * *

UNITED STATES PATENT AND TRADEMARK OFFICE
CERTIFICATE OF CORRECTION

| | |
|---|---|
| PATENT NO. | : 7,590,293 B2 |
| APPLICATION NO. | : 10/837981 |
| DATED | : September 15, 2009 |
| INVENTOR(S) | : Ottesen et al. |

It is certified that error appears in the above-identified patent and that said Letters Patent is hereby corrected as shown below:

On the Title page, in field (56), under "Other Publications", in column 2, line 14, delete "ASSSP-30," and insert -- ASSP-30, --, therefor.

On Sheet 9 of 14, in Fig. 8, line 6, delete "1e8" and insert -- 1e8) --, therefor.

In column 3, line 26, delete "$\underline{X}$." and insert -- $\underline{X}.$ --, therefor.

In column 6, line 16, delete "[QAC(1 ... $N_1$, 1 ... 1)]/2." and insert -- [QAC(I... $N_1$, 1. ..$N_2$) + QAC($N_1$... I, $N_2$... 1)]/2. --, therefor.

In column 6, line 22, delete "[QAC(1 ... $N_1$, 1 ... 1)]/2." and insert -- [QAC(1. ..$N_1$,1. ..$N_2$) - QAC($N_1$...I,$N_2$... 1)]/2. --, therefor.

In column 6, line 26, delete "$\underline{MXC}$." and insert -- $\underline{MC}$. --, therefor.

In column 6, line 28, delete "/cos(PC)." and insert -- /cos($\underline{PC}$). --, therefor.

In column 7, line 9, delete "IQ(1...$K_2$))" and insert -- IQ(1...$K_1$, 1...$K_2$)) --, therefor.

In column 8, line 20, after ",is" delete "is". (Repeated Word)

In column 10, line 51, after "sign" delete "map". (Repeated Word)

In column 12, line 60, delete "th magnitude" and insert -- the magnitude --, therefor.

In column 13, line 8, delete "Jev(1,1)" and insert -- Jev(1,1) = Jev(1,1) --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,590,293 B2 Page 1 of 1
APPLICATION NO. : 10/837981
DATED : September 15, 2009
INVENTOR(S) : Ottesen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1520 days.

Signed and Sealed this

Twenty-first Day of September, 2010

David J. Kappos
*Director of the United States Patent and Trademark Office*